United States Patent
Nagahata et al.

(10) Patent No.: US 10,212,950 B2
(45) Date of Patent: Feb. 26, 2019

(54) COMPOSITION, BATTER MATERIAL USING SAME, FOOD OR DRINK AND FEED, AND METHOD OF PRODUCING COMPOSITION

(71) Applicant: J-OIL MILLS, INC., Tokyo (JP)

(72) Inventors: Yuya Nagahata, Tokyo (JP); Junpei Kubota, Tokyo (JP); Isao Kobayashi, Tokyo (JP); Masaru Goto, Tokyo (JP)

(73) Assignee: J-OIL MILLS, INC., Tokyo (JP)

( * ) Notice: Subject to any disclaimer, the term of this patent is extended or adjusted under 35 U.S.C. 154(b) by 13 days.

(21) Appl. No.: 14/768,133

(22) PCT Filed: Dec. 19, 2013

(86) PCT No.: PCT/JP2013/084049
§ 371 (c)(1),
(2) Date: Aug. 14, 2015

(87) PCT Pub. No.: WO2014/132534
PCT Pub. Date: Sep. 4, 2014

(65) Prior Publication Data
US 2016/0000122 A1    Jan. 7, 2016

(30) Foreign Application Priority Data
Feb. 26, 2013 (JP) ................................ 2013-035406

(51) Int. Cl.
| | | |
|---|---|---|
| *A23L 29/212* | (2016.01) | |
| *A21D 10/04* | (2006.01) | |
| *A23L 2/52* | (2006.01) | |
| *A23D 7/005* | (2006.01) | |
| *A21D 10/00* | (2006.01) | |
| *A23K 20/163* | (2016.01) | |
| *A23K 50/40* | (2016.01) | |
| *A23P 10/35* | (2016.01) | |
| *A23L 7/157* | (2016.01) | |
| *A23L 19/00* | (2016.01) | |

(52) U.S. Cl.
CPC ............ *A21D 10/04* (2013.01); *A21D 10/00* (2013.01); *A23D 7/0053* (2013.01); *A23K 20/163* (2016.05); *A23K 50/40* (2016.05); *A23L 2/52* (2013.01); *A23L 7/157* (2016.08); *A23L 19/09* (2016.08); *A23L 29/212* (2016.08); *A23P 10/35* (2016.08); *A23V 2002/00* (2013.01)

(58) Field of Classification Search
USPC .................. 426/549, 630, 635, 661
See application file for complete search history.

(56) References Cited

U.S. PATENT DOCUMENTS

| | | | | |
|---|---|---|---|---|
| 5,094,872 A | * | 3/1992 | Furcsik | A21D 2/186 127/32 |
| 5,362,510 A | | 11/1994 | Yamashita | |
| 6,468,355 B1 | * | 10/2002 | Thompson | C08B 30/12 127/38 |
| 6,664,389 B1 | * | 12/2003 | Shi | C08B 30/12 127/32 |
| 7,252,836 B2 | * | 8/2007 | Brown | A21D 2/186 424/438 |
| 2003/0029444 A1 | | 2/2003 | Carbone | |
| 2006/0240099 A1 | | 10/2006 | Carbone | |
| 2009/0274815 A1 | | 11/2009 | Kobayashi | |
| 2010/0266743 A1 | | 10/2010 | Buwalda | |
| 2012/0196023 A1 | * | 8/2012 | Nagahata | A23L 2/52 426/590 |
| 2013/0209630 A1 | | 8/2013 | Buwalda | |
| 2015/0064336 A1 | | 3/2015 | Goto | |

FOREIGN PATENT DOCUMENTS

| | | |
|---|---|---|
| CN | 101516212 A | 8/2009 |
| JP | 515296 | 1/1993 |
| JP | 89871 | 1/1996 |
| JP | 89907 | 1/1996 |
| JP | 10165102 A2 | 6/1998 |
| JP | 2003219813 A2 | 8/2003 |
| JP | 2004519546 T2 | 7/2004 |
| JP | 2006265490 A2 | 10/2006 |
| JP | 2011505828 T2 | 3/2011 |
| JP | 5160690 | 3/2013 |
| WO | 2011045902 A1 | 4/2011 |

OTHER PUBLICATIONS

International Search Report dated Feb. 4, 2014 filed in PCT/JP2013/084049.

* cited by examiner

*Primary Examiner* — Lien T Tran
(74) *Attorney, Agent, or Firm* — Rankin, Hill & Clark LLP

(57) ABSTRACT

A composition containing a starch at a content of equal to or higher than 75% by mass, wherein the composition contains a low molecular weight starch as the starch at a content of equal to or higher than 3% by mass and equal to or lower than 45% by mass, the low molecular weight starch being obtainable from a starch containing amylose at a content of equal to or higher than 5% by mass as a raw material, wherein a peak molecular weight of the low molecular weight starch is equal to or higher than $3 \times 10^3$ and equal to or lower than $5 \times 10^4$, wherein a degree of swelling in cold water of the composition at 25 degrees C. is equal to or higher than 7 and equal to or lower than 20, and wherein a content of an oversieve fraction of a granulated material in the composition on 0.5 mm mesh is equal to or lower than 50% by mass.

14 Claims, No Drawings

COMPOSITION, BATTER MATERIAL USING SAME, FOOD OR DRINK AND FEED, AND METHOD OF PRODUCING COMPOSITION

TECHNICAL FIELD

The present invention relates to a composition, a batter material using thereof, a food or drink and a feed, and a method of producing such composition.

BACKGROUND ART

Polysaccharide thickeners, gelatinized starches, emulsifiers, pulverized bread and the like have been employed, in order to provide an improved moist texture and a tender texture for cereal flour foods such as breads, cakes, Japanese sweets, noodles and the like and meat foods such as hamburg steaks, sausages and the like. Nevertheless, an addition of a larger amount of these may deteriorate a workability at the time of a preparation or their original textures of foods or drinks.

On the other hand, needs for the foods containing larger amount of water, which have an enhanced moist texture and a soft texture and an easiness of swallowing, are increasing, due to preferences and a population aging of consumers.

Here, materials employing starches are described in Patent Documents 1 to 6. Patent Document 1 (Japanese Laid-Open Patent Publication No. 2006-265490) describes an unmodified gelatinized starch, which is obtained by gelatinizing an unmodified starch such as a high amylose corn starch or the like through a heat treatment with a drum dryer or the like. It is also described that the unmodified starch is gelatinized to achieve a fibrous texture or a pulp-like texture.

Patent Document 2 (Japanese Laid-Open Patent Publication No. H08-9907 [1996]) describes a material for a food substance, which is obtained by gelatinizing a high amylose corn starch with an extruder. This also describes that the obtained material for a food substance is used in the preparation of a hamburg steak and a deep-fried food "karaage".

Patent Document 3 (Japanese Laid-Open Patent Publication No. H08-9871[1996]) describes a technology for gelatinizing a potato starch and a high amylose starch or a starchiness having higher amylose content with an emulsifier agent.

Patent Document 4 (Japanese Patent Domestic Publication for PCT Application No. 2004-519546) describes a technology for gelatinizing an amylose-rich starch by a drum drying process.

Patent Document 5 (Japanese Laid-Open Patent Publication No. H10-165102[1998]) describes a technology related to a bean paste food having an anti-syneresis property that contains a gelatinized starch of a high amylose corn starch.

Also, Patent Document 6 (Japanese Laid-Open Patent Publication No. H5-15296 [1993]) describes a technology, in which a modified starch satisfying specific conditions of a solubility in hot water, a degree of swelling in cold water, ratios of these and a particle size is employed for bakery foods.

RELATED DOCUMENTS

Patent Documents

[Patent Document 1] Japanese Laid-Open Patent Publication No. 2006-265490
[Patent Document 2] Japanese Laid-Open Patent Publication No. H08-9907 [1996]
[Patent Document 3] Japanese Laid-Open Patent Publication No. H08-9871 [1996]
[Patent Document 4] Japanese Patent Domestic Publication for PCT Application No. 2004-519546
[Patent Document 5] Japanese Laid-Open Patent Publication No. H10-165102 [1998]
[Patent Document 6] Japanese Laid-Open Patent Publication No. H05-15296 [1993]

SUMMARY OF THE INVENTION

Problems to be Solved by the Invention

There are still margins for improvements in the technologies described in Patent Documents 1 to 6, in terms of enhancing balances among a water absorption ratio, an eating-texture, a less stickiness and an anti-lumping property.

Means for Solving the Problems

According to one aspect of the present invention, there is provided a composition containing a starch at a content of equal to or higher than 75% by mass,
wherein the composition contains a low molecular weight starch as the starch at a content of equal to or higher than 3% by mass and equal to or lower than 45% by mass, the low molecular weight starch being obtainable from a starch containing amylose at a content of equal to or higher than 5% by mass as a raw material, wherein a peak molecular weight of the low molecular weight starch is equal to or higher than $3 \times 10^3$ and equal to or lower than $5 \times 10^4$,
wherein a degree of swelling in cold water of the composition at 25 degrees C. is equal to or higher than 7 and equal to or lower than 20, and
wherein a content of an oversieve fraction in the composition on 0.5 mm mesh is equal to or lower than 50% by mass.

According to another aspect of the present invention, there is provided a batter material containing the aforementioned composition according to the present invention.

According to further aspect of the present invention, there is provided a food or drink containing the aforementioned composition according to the present invention.

According to yet other aspect of the present invention, there is provided a feed containing the aforementioned composition according to the present invention.

According to yet other aspect of the present invention, there is provided a method of producing a composition, including:
reducing a molecular weight of a starch containing amylose at a content of equal to or higher than 5% by mass to obtain a low molecular weight starch exhibiting peak molecular weight of equal to or higher than $3 \times 10^3$ and equal to or lower than $5 \times 10^4$; and
gelatinizing a raw material, the raw material containing the low molecular weight starch at a content of equal to or higher than 3% by mass and equal to or lower than 45% by mass, and, a summation of the contents of the low molecular weight starch and other starches except the low molecular weight starch being equal to or higher than 75% by mass,
wherein a degree of swelling in cold water of the composition at 25 degrees C. is equal to or higher than 7 and equal to or lower than 20, and
wherein a content of an oversieve fraction in the composition on 0.5 mm mesh is equal to or lower than 50% by mass.

In addition to above, any arbitrary combination of each of these constitutions or conversions between the categories of the invention such as a process, a device, and the like may also be within the scope of the present invention.

For example, according to yet other aspect of the present invention, there is provided a use of the aforementioned composition according to the present invention for a batter material, a food or drink or a feed.

According to yet other aspect of the present invention, there is provided a method of producing a batter material, a food or drink or a feed, including: preparing the aforementioned composition according to the present invention; and blending the aforementioned composition to prepare the batter material, the food or drink or the feed.

According to yet other aspect of the present invention, there is provided a use of the aforementioned composition according to the present invention for a production of a batter material, a food or drink or a feed.

Advantageous Effects of the Invention

According to the present invention, a novel material exhibiting enhanced balance among the water absorption ratio, the less stickiness, and the anti-lumping property can be obtained. In addition, for example, an improved eating-texture and an enhanced workability can be obtained when being blended to various types of foods.

DESCRIPTION OF EMBODIMENTS

A composition of the present embodiment contains a starch as an essential constituent. More specifically, in view of reducing a stickiness or a flavor deterioration when being blended to foods and the like, the composition according to the present embodiment contains the starch at a content of equal to or higher than 75% by mass. In addition, from the above-described point of view, the starch content is preferably equal to or higher than 80% by mass, and further preferably equal to or higher than 85% by mass.

On the other hand, the upper limit of the starch content in the composition is not particularly limited, and thus is equal to or lower than 100% by mass, and it may be, for example, equal to or lower than 99.5% by mass, equal to or lower than 99% by mass, equal to or lower than 95% by mass, or the like, depending on eating-textures and the like of the foods to be blended.

In addition, the composition according to the present embodiment contains a low molecular weight starch, which is made from a raw material starch containing amylose at a content of equal to or higher than 5% by mass, at a specific proportion as the above-described starch, and the low molecular weight starch having a specific size is employed. More specifically, the low molecular weight starch, which is made from the starch having amylose content of equal to or higher than 5% by mass, is contained in the starch in the composition at a content of equal to or higher than 3% by mass and equal to or lower than 45% by mass in the composition, in which a peak molecular weight of the low molecular weight starch is equal to or higher than $3 \times 10^3$ and equal to or lower than $5 \times 10^4$.

The lower limit of the peak molecular weight of the low molecular weight starch is equal to or higher than $3 \times 10^3$ and preferably equal to or higher than $8 \times 10^3$, in view of achieving less stickiness. On the other hand, the upper limit of the peak molecular weight of the low molecular weight starch is equal to or lower than $5 \times 10^4$, in view of enhancing the balance among a higher water absorption ratio, a less stickiness, and an anti-lumping property, and preferably equal to or lower than $3 \times 10^4$, and more preferably equal to or lower than $1.5 \times 10^4$. Here, the method for measuring the peak molecular weight of the starch after the degradation will be discussed later in Examples.

The content of the low molecular weight starch in the composition is equal to or higher than 3% by mass, in view of enhancing the balance among the higher water absorption ratio, the less stickiness, and the anti-lumping property, and preferably equal to or higher than 8% by mass, and more preferably equal to or higher than 13% by mass.

On the other hand, the upper limit of the content of the low molecular weight starch in the composition is equal to or lower than 45% by mass, in view of enhancing the higher water absorption ratio and the less stickiness, and preferably equal to or lower than 35% by mass, and more preferably equal to or lower than 25% by mass.

The content of amylose in the raw material starch for the low molecular weight starch is equal to or higher than 5% by mass, preferably equal to or higher than 12% by mass, more preferably equal to or higher than 22% by mass, and further preferably equal to or higher than 50% by mass. On the other hand, the upper limit of the content of amylose in the raw material starch for the low molecular weight starch is not particularly limited, and is equal to or lower than 100% by mass.

One, two or more starches selected from the group consisting of a high amylose corn starch, a corn starch, a tapioca starch, a sweet potato starch, a potato starch, a wheat starch, a high amylose wheat starch, a rice starch and a modified starch that is obtained by chemically, physically or enzymatically processing these starches as the raw materials, may be employed for the starch containing amylose at a content of equal to or higher than 5% by mass, which is the raw material for the low molecular weight starch. It is preferable to employ one, two or more starches selected from the high amylose corn starch, the corn starch and the tapioca starch in view of providing the high water absorption ratio, and is preferable to employ the high amylose corn starch in view of enhancing the balance among increased water absorption ratio, the less stickiness, and the anti-lumping property. High amylose corn starch containing amylose at a content of equal to or higher than 40% by mass is available.

Also, the composition according to the present embodiment is configured to satisfy the specific conditions of a degree of swelling in cold water and a particle size. First of all, in the present embodiment, the degree of swelling in cold water is equal to or higher than 7 in view of moderately enhancing the water absorption ratio, and is preferably equal to or larger than 7.5, and is more preferably equal to or higher than 9. Excessively lower degree of swelling in cold water may provide an insufficient hardness of a water-absorbed dough and a poor effect on enhancing a softness and a moist texture.

On the contrary, excessively higher degree of swelling in cold water may provide an excessively doughy eating-texture, and thus the suitable degree of swelling in cold water is equal to or lower than 20, and is preferably equal to or lower than 17. Here, the method of measuring the degree of swelling in cold water of the composition will be discussed later in Examples.

Also, concerning the particle size of the composition according to the present embodiment, a content of the oversieve fraction in the composition on 0.5 mm mesh according to the Japanese Industrial Standard JIS-Z8801-1 is equal to or lower than 50% by mass, in view of obtaining an appropriate water absorbability and binding property, and is preferably equal to or lower than 40% by mass, and is further preferably equal to or lower than 30% by mass. On the other hand, the lower limit of the content of the oversieve fraction in the composition on 0.5 mm mesh is not particularly limited, and is equal to or higher than 0% by mass.

Also, the lower limit of the particle size of the composition is not particularly limited, and may be suitably controlled on the basis of the type and the size of a food or drink to which the composition is blended, and for example, the content of an undersieve fraction in the composition under 0.01 mm mesh according to JIS-Z8801-1 standard is preferably equal to or lower than 1.5% by mass, and is more preferably equal to or lower than 1% by mass.

Also, in view of enhancing the balance between the less stickiness and the anti-lumping property in the present embodiment, an amount of a soluble fraction in the composition at 25 degrees C. is, for example, equal to or lower than 32%, and is preferably equal to or lower than 25%, and is more preferably equal to or lower than 20%. Excessively higher soluble fraction may easily create lumps at the time of water absorption and may also exhibit increased stickiness of the water-absorbed dough. The lower limit of the amount of soluble fraction in the composition at 25 degrees C. is not particularly limited, and is equal to or larger than 0%.

Here, method of measuring the amount of soluble fraction in the composition will be discussed later in Examples.

A viscosity of the composition is equal to or lower than 4,200 mPa·s in view of suppressing the formation of the lumps and providing reduced stickiness, and is preferably equal to or lower than 3,600 mPa·s, and is more preferably equal to or lower than 1,600 mPa·s.

Also, the viscosity of the composition is equal to or higher than 80 mPa·s, in view of obtaining an appropriate binding property and a hardness of the water-absorbed dough, and is preferably equal to or higher than 100 mPa·s, and more preferably is equal to or higher than 300 mPa·s.

The viscosity at this time is determined as a value of the viscosity measurement of a uniform slurry liquid (at 14 degrees C.) with a Brookfield viscometer, which is obtained by adding, drop by drop, a uniform mixture of 35 g on dry weight basis of the composition and 0.5 g of guar gum, into 350 g of water that is stirred with metal blades.

Also, an amount of a soluble fraction in hot water of the composition at 90 degrees C. is preferably equal to or higher than 8.5% by mass, in view of reducing starchy texture and powdery texture after being cooked with heat, and is more preferably equal to or higher than 10% by mass, and is further preferably equal to or higher than 14% by mass.

On the other hand, the amount of the above-described soluble fraction in hot water is preferably equal to or lower than 70% by mass, in view of suppressing gooey or sticky texture after being cooked with heat and suppressing being mush during boiling, and is more preferably equal to or lower than 48% by mass, and is even more preferably equal to or lower than 41% by mass. Here, the method of measuring the amount of soluble fraction in hot water in the composition will be discussed later in Examples.

Also, the water absorption ratio of the composition is, for example, equal to or higher than 500% over the dry weight of the composition, in view of suitably balancing the water absorption ratio and the eating-texture, is preferably equal to or higher than 600%, and is even more preferably equal to or higher than 650%. On the other hand, from the above-described point of view, the water absorption ratio of the composition is, for example, equal to or lower than 1,500% over the dry weight of the composition, is preferably equal to or lower than 1,200%, is even more preferably equal to or lower than 900%.

Various types of starches may be employed for a starch component in the composition except the above-described low molecular weight starch in the present embodiment. More specifically, starches that are generally commercially available for specific applications, such as for example, starches for foods or feeds, may be employed regardless of the types of the starches, and one or more type(s) of starches may be suitably selected from: starches including a corn starch, a potato starch, a tapioca starch, a wheat starch and the like; and a modified starch that is obtainable by chemically, physically or enzymatically processing these starches. It is preferable to contain one, two or more starch(es) selected from the group consisting of the corn starch, the wheat starch, the potato starch, the tapioca starch and the cross-linked starch of these starches.

In addition, the composition according to the present embodiment may be formulated with a component except the starch.

Specific examples of such component except starch include: saccharides such as sugar and the like (except polysaccharide); proteins such as gluten and the like; cereal flours such as soy bean powder and the like (for example, defatted soy flower); polysaccharides such as pectin and the like and other gums; oils and fats; food coloring; emulsifying agents; and insoluble salts such as calcium carbonate, calcium sulfate and the like.

Since the hardness of the composition can be controlled by blending the emulsifying agent, the eating-texture can be changed depending on the added foods and the like.

In addition, a porous structure of the composition can be stabilized by adding insoluble salts such as calcium carbonate and the like, thereby achieving improved production stability.

In addition, an elasticity and a hardness of a dough can be controlled by containing the cereal flour such as defatted soy flour and the like.

In the next, the method of producing the composition according to the present embodiment will be described. The method of producing the composition according to the present embodiment includes: reducing the molecular weight of the starch containing amylose at a content of equal to or higher than 5% by mass to obtain the low molecular weight starch exhibiting the peak molecular weight of equal to or higher than $3\times10^3$ and equal to or lower than $5\times10^4$; and gelatinizing raw materials, the raw materials containing the low molecular weight starch at a content of equal to or higher than 3% by mass and equal to or lower than 45% by mass, and a summation of the contents of the low molecular weight starch and other starch except the low molecular weight starch being equal to or higher than 75% by mass.

The step of reducing molecular weight of the starch to obtain the low molecular weight starch is the process step of the degrading the starch containing amylose at a content of equal to or higher than 5% by mass into the low molecular weight starch. The term degradation used here refers to the degradation that involves reduction of molecular weight of starch, and the typical degradation process includes a degradation by an acid treatment, an oxidation treatment, or an enzymatic treatment. Among these, the acid treatment may be the best choice, in view of the degradation rate and the production cost, and the reproducibility of the degrading reaction.

General methods employed for the gelatinization of the starch may be adopted for the step of gelatinizing the raw material. More specifically, gelatinization processes employing machines such as a drum dryer, a jet cooker, an extruder, a spray dryer and the like are known, and the gelatinization process employing the extruder or the drum dryer is suitable in the present embodiment, in view of more surely obtaining the composition having the degree of swelling in cold water that meets the above-described specific condition, and the process with the extruder is the most suitable.

According to the process employing the extrusion granulator equipped with the extruder or the like, the gelatinization is achieved at least in the vicinity of the surface of the composition and the composition having a moderately lower density is obtainable, such that the composition having a moderately higher water absorption ratio and an enhanced syneresis-suppressing effect can be more stably obtained. When the extruder treatment is conducted, water is normally added to the raw material containing starch to adjust the water content within the range of from about 10 to 60% by mass, and then an expansion in heating process is achieved under the conditions of, for example, the barrel temperature of 30 to 200 degrees C., the outlet temperature of 80 to 180 degrees C., the screw revolution speed of 100 to 1,000 rpm, and the heat processing time of 5 to 60 seconds. The degree of the gelatinization in the case of using the extruder is set to be, for example, equal to or higher than 20%, in view of suppressing the generation of the lumps, and is preferably equal to or higher than 30%. On the other hand, in view of suppressing the stickiness, the degree of the gelatinization in the case of using the extruder is set to be, for example, equal to or lower than 100%, is preferably equal to or lower than 80%, and even more preferably equal to or lower than 70%.

Alternatively, the gelatinized processing employing the drum dryer allows providing more sufficiently increased degree of the gelatinization, so that the composition having an enhanced water absorption ratio can be more stably obtained. When the drum dryer treatment is conducted, the slurry of the raw material containing the starch exhibiting heavy Baume degree of about 10 to 22 is normally supplied through an ONLATOR™ to heat thereof at the outlet temperature of about 90 to 140 degrees C. to obtain a gelatinized liquid, and this gelatinized liquid is promptly spread thinly over the drum dryer that is heated to about 100 to 200 degrees C. to carry out heat dry, and then the dried material is scratched off the drum dryer. The degree of the gelatinization in the case of using the drum dryer is set to be, for example, equal to or higher than 20%, in view of suppressing the generation of the lump, and is preferably equal to or higher than 30%. On the other hand, in view of reducing the stickiness, the degree of the gelatinization in the case of using the drum dryer is set to be, for example, equal to or lower than 100%, and is preferably equal to or lower than 98%.

In the method of producing the composition according to the present embodiment, for example, the step of gelatinizing the above-described specific raw material allows obtaining the composition having the degree of swelling in cold water that meets the above-described specific condition.

Also, it is desirable that the composition obtained through the gelatinized step is pulverized and sieved as necessary to obtain suitably controlled sizes. This processing allows more stably adjusting the degree of swelling in cold water and obtaining appropriate binding property.

The composition obtainable in the present embodiment, which is configured to contain the above-described low molecular weight starch and to satisfy all the specific conditions of the starch content, the content of the low molecular weight starch, the degree of swelling in cold water and the particle size, exhibits moderately high water absorption ratio, enhanced effect of reducing the stickiness, and effectively suppressed generation of the lump, such that the composition can be effectively employed as the water-absorbing material for being blended to, for example, foods, or various types of batter materials such as batter liquid and the like, or feeds or the like. Also, the composition obtainable in the present embodiment can provide improved eating-texture and enhanced workability, when being blended to, for example, various types of foods.

The composition obtainable in the present embodiment can also be used for the foods or drinks together with such as the cereal flour, so that the foods or drinks having higher water contents can be provided.

Also, the composition obtainable in the present embodiment contains the starch as the essential component, such that a natural eating-texture can be presented when being used as a cereal flour-substitute in comparison with the case of using a gelling agent, without a need for considerably changing the formulation of the cereal flour.

Also, the batter material, the foods or drinks or the feeds according to the present embodiment contain the obtained composition. The composition according to the present embodiment can be preferably blended to, for example, the batter material, foods or drinks or the feeds, which contain starch.

Specific examples of the batter material include a batter, a separating powder, a breader and the like, and the batter is particularly preferable. Also, specific examples of foods and drinks include livestock meat processed foods such as a hamburg steak, a meat ball, a shao-mai (shumai), a dumpling, a sausage and the like; fish meat processed foods such as a fish meat sausage, a minced fish and the like; salads such as a potato salad, a tuna salad and the like; fillings such as a red bean paste including a strained red bean paste and a red bean paste containing whole beans, a custard cream and the like; sauces such as a tomato sauce, a white sauce, a demiglace sauce and the like; baked confectionery such as a sponge cake, a castella cake, a Monaka (red bean paste-filled wafers) and the like; and cereal flour dough foods such as a bread, a noodle, a rice dumpling, a serial food and the like. Also, these also typically include delicatessen foods including marinated foods, simmered foods, stuffed breads and the like, in addition to the livestock meat processed foods, fish meat processed foods and salads.

Also, specific examples of the feeds include pet foods for dogs or cats, or compound feeds for livestock or fowls.

EXAMPLES

Examples of the present invention will be described as follows, and it is not intended to limit the scope and the spirit of the present invention thereto.

In the following examples, the unit for the formulation is "% by mass," unless otherwise indicated. The "part" is "part by weight" unless otherwise indicated.

The following materials were mainly employed for the raw materials: high amylose corn starch (commercially available from J-OIL MILLS, Inc., amylose content 70% by mass); corn starch (commercially available from J-OIL MILLS, Inc., amylose content 25% by mass); waxy corn starch (commercially available from J-OIL MILLS, Inc., amylose content 0% by mass); tapioca starch (commercially available from J-OIL MILLS, Inc., amylose content 16% by mass); phosphate cross-linked tapioca starch (commercially available from J-OIL MILLS, Inc., Jelcall TP-1); phosphate cross-linked wheat starch (commercially available from J-OIL MILLS, Inc. Co., Ltd., Jelcall WP); potato starch (commercially available from J-OIL MILLS, Inc.); calcium carbonate (commercially available from SHIRAISHI CALCIUM KAISHA, LTD, Collocalso Ex); defatted soybean powder (commercially available from Nikka Fats & Oils Co., Ltd., Milky S); emulsifying agent (commercially available from Riken Vitamin Co., Ltd., Emulsy MS); and oil or fat processed tapioca starch (HB-2 commercially available from J-OIL MILLS, Inc. Co., Ltd.).

The production of the low molecular weight starch through the acid treatment was conducted by the following processes.

(Acid Treatment)

A starch was suspended in water to prepare a 35.6% (w/w) slurry, and the slurry was heated to 50 degrees C. A hydrochloric acid aqueous solution, which had been prepared to be 4.25 N, was added therein at an amount of ⅛ of the slurry weight while being stirred to start the reaction. After 16 hours of the reaction, the slurry was neutralized with 3% NaOH, and then was washed with water, was dehydrated and was dried to obtain acid-treated starch. The acid treatments were carried out for various types of starches, which were the high amylose corn starch, the corn starch, the waxy corn starch and the tapioca starch.

In addition, when the level of the degradation of the starch was to be changed, the reaction time for the acid treatment was adjusted to fall within 1 to 100 hours.

In the following examples, the water absorption ratio, the degree of swelling in cold water, the amount of soluble fraction, the amount of soluble fraction in hot water, the viscosity, the evaluation of lump, the dough hardness, the evaluation of stickiness of dough, the peak molecular weight and degree of gelatinization were measured by the following methods.

(Method for Measuring Water Absorption Ratio, Degree of Swelling in Cold Water and Amount of Soluble Fraction)

(1) A sample was heat dried at 130 degrees C. to measure the water content by employing an aquameter (Kensei Co., Ltd., Electromagnetic Aquameter: Model Number MX50), and the dry weight was calculated from the obtained water content.

(2) 1 g (A=1) on dry weight basis of this sample was in a dispersed condition in 50 mL of water at 25 degrees C., and was gently stirred in a constant temperature reservoir at 25 degrees C. for 30 minutes, and then was centrifuged at 3,000 rpm for 10 minutes (centrifugal separator: Hitachi tabletop ultracentrifuge CT6E, commercially available from Hitachi Koki Co., Ltd.; rotor: T4SS swing rotor: adapter: 50TC X 2S adapter) to be separated into a sediment layer and a supernatant layer.

(3) The supernatant layer was removed and the weight of the sediment layer was measured and the weight was determined as B (g).

(4) The sediment layer was dried to be solidified (105 degrees C., constant weight), and the weight thereof was determined as C (g).

(5) The water absorption ratio (%) was calculated through (B−A)/A×100.

(6) B/C was adopted for the degree of swelling in cold water.

(7) (A−C)/A×100 was adopted for the amount of soluble fraction (%).

(Method of Measuring Amount of Soluble Fraction in Hot Water)

(1) A sample was heat dried at 130 degrees C. to measure the water content by employing an aquameter (Kensei Co., Ltd., Electromagnetic Aquameter: Model Number MX50), and the dry weight was calculated from the obtained water content.

(2) 1 g (A=1) on dry weight basis of this sample was in dispersed condition in 50 mL of water at 25 degrees C., and was allowed to stand still in a constant temperature reservoir at 90 degrees C. for 30 minutes, and then was centrifuged at 3,000 rpm for 10 minutes (centrifugal separator: Hitachi tabletop ultracentrifuge CT6E, commercially available from Hitachi Koki Co., Ltd.; rotor: T4SS swing rotor: adapter: 50TC X 2S adapter) to be separated into a sediment layer and a supernatant layer.

(3) The supernatant layer was removed, and the sediment layer was dried to be solidified (105 degrees C., constant weight), and the weight thereof was determined as B (g).

(4) (A−B)/A×100 was adopted for the amount of soluble fraction in hot water (%).

(Method of Measuring Viscosity)

(1) A 500 mL plastic cup containing 350 mL of water at 14 degrees C. was prepared, and stirring blades made of a metal (commercially available from EYELA, angled fan turbine, shaft diameter 0.8 cm, blade diameter 8 cm, product code 122780) were employed to stir thereof at 350 rpm.

(2) A uniform mixture of 35 g on dry weight basis of the sample and 0.5 g of guar gum (Guarpack PF-20, commercially available from Gokyo Trading) was added thereto drop by drop, and the entire sample was added in 50 to 60 seconds.

(3) Afterwards, the revolution speed was increased to 750 rpm, and the stirring was continued until 3 minutes elapsed from the beginning of the addition of the above (2) as the total stirring time to obtain a slurry liquid.

(4) The slurry liquid was rapidly poured into a 300 mL tall beaker, and viscosity was measured with a Brookfield viscometer (TOKIMEC. INC, model: BM) (rotor revolution speed 60 rpm; measuring time 60 seconds).

(Method of Evaluating Lump)

(1) The whole quantity of the slurry liquid after the viscosity was measured was diluted with water to 1,000 g, and then was stirred slowly to obtain a dispersion solution of the slurry.

(2) The dispersion was passed through the 1.0 mm mesh sieve according to JIS-Z8801-1 standard, and the over-sieved lumps were recovered. Then, 1 L of water was poured over the obtained lumps recovered on the sieve to wash the lumps.

(3) The weight of the oversieved lumps was measured.

(Criterion for Evaluation of Lump)

X (cross): equal to or more than 1 g;

Δ(triangle): equal to or more than 0.5 g and less than 1 g;

○ (circle): equal to or more than 0.1 g and less than 0.5 g; and

⊚ (double circles): less than 0.1 g.

(Method for Evaluating Dough Hardness and Dough Stickiness)
(1) 10 g on dry weight basis of the sample was taken to a beaker, and water was added such that the gross weight of the starch and water was 50 g in total.
(2) This was rapidly treated with a spatula to become into paste.
(3) The created lumps were mashed between the wall of the beaker and the pressing spatula to be homogenized.
(4) The beaker was covered with a cap, and was allowed to stand still for one hour to provide a water-absorbed dough.
(5) The property of this water-absorbed dough was evaluated by the consultation of two panels through touching it with fingers to determine the evaluation of the stickiness.
(6) The measurement of the dough hardness was carried out by employing a texture analyzer TA-XT2i, commercially available from Stable Micro Systems.
(7) A cylindrical aluminum container of 37.9 mm in diameter and 13.0 mm in height was stuffed with the water-absorbed dough so as to level the top surface to be flat, and a circular plunger of 25 mm was used to compress the top thereof by 3 mm in height under the conditions of pre-test speed: 10 mm/s; test speed: 5 mm/s; post-test speed: 5 mm/s; and trigger force: 50 g. The maximum stress (g) obtained when the water-absorbed dough was compressed was determined as the dough hardness.

(Criterion for Evaluation of Dough Stickiness)
X (cross): very much sticky;
Δ(triangle): moderately sticky;
○ (circle): not very sticky; and
⊚ (double circles): no sticky.

(Criterion for Evaluation of Dough Hardness)
X (cross): lower than 200 g;
Δ(triangle): equal to or higher than 200 g and lower than 300 g;
○ (circle): equal to or higher than 300 g and lower than 400 g; and
⊚ (double circles): equal to or higher than 400 g.

(Method of Measuring Peak Molecular Weight)
The measurement of the peak molecular weight was carried out according to the following procedures by employing an HPLC unit commercially available from TOSOH CORPORATION (pump: DP-8020, RI detector: RS-8021, and degasifier: SD-8022).
(1) The sample was pulverized to adjust the size as being equal to or smaller than the 0.15 mm mesh according to JIS-Z8801-1 standard. This sample was suspended in a moving phase so as to achieve 1 mg/mL, and the resultant suspension was heated at 100 degrees C. for 3 minutes to be completely dissolved. A filtration was conducted by using a 0.45 μm filtration filter (commercially available from ADVANTEC Co., Ltd., DISMIC-25HP PTFE 0.45 μm), and the resultant filtrate was obtained as an analytical sample.
(2) Molecular weight was measured under the following analytical conditions.
column: TSK gel α-M (7.8 mm φ, 30 cm) (commercially available from TOSOH CORPORATION), two columns;
flow rate: 0.5 mL/min.;
moving phase: 5 mM $NaNO_3$-containing 90% (v/v) dimethylsulfoxide solution;
column temperature: 40 degrees C.; and
analytical quantity: 0.2 mL.
(3) Detector data were collected by utilizing a software (Multistation GPC-8020, Model II, Data acquisition ver 5.70, commercially available from TOSOH CORPORATION), and a molecular weight peak was calculated.
A pullulan (commercially available from Showa Denko Co., Ltd., Shodex Standard P-82), molecular weight of which had been known, was employed for obtaining the calibration curve.

(Method of Measuring Degree of Gelatinization)
A measurement of the degree of gelatinization for the starch in the composition was conducted by a β-amylase-pullulanase (BAP) method.
(1) The composition was pulverized in advance to adjust the particle size as being equal to or smaller than the 0.15 mm mesh according to JIS-Z8801-1 standard, and the resultant product was employed as a measurement sample.
(2) According to the process described in Denpun Kagaku, Vol. 28, 4, pp. 235-240 (1981), entitled "New measuring method for gelatinizing degree and aging degree of starch by employing β-amylase-pullulanase (BAP) system," the degree of gelatinization (%) of the starch in the composition in each of the examples was measured.

In the following examples, methods of sensory evaluations and criteria for evaluations were as follows.

(Evaluation of Rice-Flour Dumpling)
(1) The composition, rice flour for dumplings and water were formulated, and were well kneaded to provide rice-flour dumpling dough. In addition to above, a formulation without adding the composition was employed as Control Example.
(2) The dough was divided into small cakes of 8 g each, and the cakes were formed into smooth spherical shape.
(3) The formed rice-flour dumpling dough was put into boiling hot water, and was boiled for 4 minutes, and then was cooled with chilled water for 3 minutes.
(4) Water was drained well, and then the rice-flour dumplings after 6 hours were used for sensory evaluations.

(Criterion for Evaluation)
Sensory evaluations on the gathering and the stickiness of the dough in work steps of the above-described (1) to (2), and the eating-texture of the obtained rice-flour dumpling were conducted by 3 panels, and the evaluations were made by the consultation.

(Workability) Gathering
x (cross): poor cohesion of the dough, hard to be gathered;
○ (circle): easy to be gathered, but deformable by application of force; and
⊚ (double circles): good cohesion of the dough, hard to be deformed.

(Workability) Stickiness
x (cross): sticky;
Δ(triangle): moderately sticky;
○ (circle): not very sticky; and
⊚ (double circles): no sticky.

(Eating-Texture) Softness
x (cross): hard;
Δ(triangle): moderately hard;

○ (circle): soft; and
◎ (double circles): very soft.
(Eating-Texture) Elasticity
x (cross): inelastic;
Δ(triangle): moderately inelastic;
○ (circle): elastic; and
◎ (double circles): very elastic.
(Eating-Texture) Smoothness
x (cross): gritty;
○ (circle): smooth; and
◎ (double circles): very smooth.
(Evaluation of Hamburger Steak)
(1) 20 g of the composition was weighted and put into a 500 mL beaker.
(2) Water of a weight of 4 times of the composition weight was added to the composition, and the composition was dipped at a room temperature (about 25 degrees C.) for 15 minutes.
(3) 25 parts of the sample prepared according to the above (2) was added to a dough prepared by kneading raw materials, which contained 40.0 parts of commercially available chicken minced meat, 17.0 parts of onion, 14.0 parts of bread crumbs, 12.0 parts of edible oil, 8.0 parts of corn starch, 6.8 parts of water, 1.0 part of sugar, 0.7 part of salt, 0.3 part of sodium glutamate, and 0.2 part of pepper, and the dough was kneaded well once again.
(4) Each of 50 g of a flat dough was separated and formed by cutting the dough containing the composition impregnated therein, and was steamed with a steam oven at 250 degrees C. for 5 minutes, and then was allowed to be cooled at a room temperature for 1 hour, and eventually the resultant product was employed for the sensory evaluation.
(Criteria for Evaluations)
Evaluations of the workability related to the hamburger steak dough during the work steps of the above-described (1) to (4) and the sensory evaluations on the eating-textures of the obtained hamburg steaks were conducted by 3 panels, and the evaluations were made by the consultation. The criteria for the evaluations are shown as follows.
(Workability of Dough)
x (cross): sticky;
Δ(triangle): moderately sticky;
○ (circle): not very sticky; and
◎ (double circles): no sticky.
(Eating-Texture)
x (cross): starchy;
Δ(triangle): moderately starchy;
○ (circle): not very starchy; and
◎ (double circles): no starchy, and good.

Examples 1-1 to 1-5, and Comparative Example 1-1

Raw materials were blended according to the formulation as shown in Table 1, and the materials were mixed in a bag until it was sufficiently uniformly mixed. A mixture obtained was compressively and heat processed by employing a twin-screw extruder (KEI-45, commercially available from KOWA INDUSTRIES CO., LTD.). The processing conditions were as follows. Raw material supply: 450 g/minute; addition of water: 17%: barrel temperature: 50 degrees C., 70 degrees C. and 100 degrees C., respectively from raw material inlet toward outlet; outlet temperature: 100 to 110 degrees C.; and speed of screw revolution: 250 rpm.

The gelatinized products obtained by the extruder processing were dried at 110 degrees C. to adjust the water content to fall within a range of from 2 to 10% by mass.

Subsequently, the dried gelatinized materials were pulverized with a tabletop cutter mill. While the particle size distribution in such case depended upon the type of the pulverized product, particles undersieve under the 1 mm mesh and oversieve on 0.5 mm mesh was 20 to 40% by mass; and particles undersieve under the 0.5 mm mesh was 60 to 80% by mass, according to JIS-Z8801-1 standard.

This pulverized product was classified with the sieve of 0.5 mm mesh, and the fraction of the undersieve particles were evaluated.

The raw material formulations of the composition, the results of the analysis and the results of the evaluation are all shown in Table 1.

TABLE 1

| | | COMPARATIVE EXAMPLE 1-1 | EXAMPLE 1-1 | EXAMPLE 1-2 | EXAMPLE 1-3 | EXAMPLE 1-4 | EXAMPLE 1-5 |
|---|---|---|---|---|---|---|---|
| FORMULATION (% BY MASS) | LOW MOLECULAR WEIGHT HIGH AMYLOSE CORN STARCH (PEAK MOLECULAR WEIGHT: $1.2 \times 10^4$) | | 5 | 10 | 15 | 20 | 30 |
| | CORN STARCH | 99 | 94 | 89 | 84 | 79 | 69 |
| | CALCIUM CARBONATE | 1 | 1 | 1 | 1 | 1 | 1 |
| AMYLOSE CONTENT IN RAW MATERIAL FOR LOW MOLECULAR WEIGHT STARCH (% BY MASS) | | — | | | 70 | | |
| FORMULATION OF LOW MOLECULAR STARCH IN RAW MATERIAL (% BY MASS) | | 0 | 5 | 10 | 15 | 20 | 30 |
| ANALYSIS RESULT | WATER ABSORPTION RATIO (%) | 618 | 784 | 684 | 694 | 783 | 634 |
| | DEGREE OF SWELLING IN COLD WATER | 14.8 | 11.8 | 9.8 | 9.4 | 10.0 | 7.9 |
| | AMOUNT OF SOLUBLE FRACTION (%) | 51.5 | 25.0 | 20.2 | 15.8 | 11.6 | 7.5 |
| | AMOUNT OF SOLUBLE FRACTION IN HOT WATER (%) | 46.8 | 38.0 | 32.9 | 34.0 | 23.7 | 21.3 |
| | VISCOSITY (mPa·s) | 4800 | 1720 | 1540 | 700 | 420 | 140 |
| EVALUATION RESULT | EVALUATION OF LUMP (g) | 9.3 X | 0 ◎ | 0 ◎ | 0 ◎ | 0 ◎ | 0 ◎ |
| | DOUGH HARDNESS (g) | 276 Δ | 483 ◎ | 438 ◎ | 511 ◎ | 664 ◎ | 385 ○ |
| | EVALUATION OF DOUGH STICKINESS | X | Δ | ○ | ◎ | ◎ | ○ |

According to Table 1, it is the tendency that larger blending amount of the acid-treated high amylose corn starch of decreased molecular weight provides lower degree of swelling in cold water, lower soluble fraction and lower viscosity. In the case that the low molecular weight starch was not added, the soluble fraction was considerably increased and the viscosity is increased, and the lumps of the composition are easily created, presenting worse evaluation results of the dough (Comparative Example 1-1). When the composition exhibiting better anti-lumping property and better balance between the water absorbability and the stickiness is to be obtained, the acid-treated high amylose corn starch of reduced molecular weight was blended at an amount of at least 5% by mass or more to obtain preferable result, and was blended at an amount of equal to or higher than 10% by mass to obtain further preferable result.

Examples 2-1 to 2-3, Comparative Examples 2-1 to 2-5

Raw materials were blended at the proportions shown in Table 2, and the compositions were obtained in conformity to Example 1-4. Evaluations were made as in Example 1-4. The results for the obtained compositions are shown in Table 2.

TABLE 2

| | | EXAMPLE 2-1 | EXAMPLE 2-2 | COMPARATIVE EXAMPLE 2-1 | COMPARATIVE EXAMPLE 2-2 |
|---|---|---|---|---|---|
| FORMULATION (% BY MASS) | LOW MOLECULAR WEIGHT CORN STARCH (PEAK MOLECULAR WEIGHT. $1.9 \times 10^4$) | 20 | 30 | 50 | 99 |
| | LOW MOLECULAR WEIGHT TAPIOCA STARCH (PEAK MOLECULAR WEIGHT. $2.1 \times 10^4$) | | | | |
| | LOW MOLECULAR WEIGHT WAXY CORN STARCH (PEAK MOLECULAR WEIGHT. $2.3 \times 10^4$) | | | | |
| | CORN STARCH | 79 | 69 | 49 | 0 |
| | CALCIUM CARBONATE | 1 | 1 | 1 | 1 |
| AMYLOSE CONTENT IN RAW MATERIAL FOR LOW MOLECULAR WEIGHT STARCH (% BY MASS) | | | | 25 | |
| FORMULATION OF LOW MOLECULAR WEIGHT STARCH IN RAW MATERIAL (% BY MASS) | | 20 | 30 | 50 | 99 |
| ANALYSIS RESULT | WATER ABSORPTION RATIO (%) | 757 | 626 | 496 | 260 |
| | DEGREE OF SWELLING IN COLD WATER | 11.2 | 9.4 | 8.6 | 5.1 |
| | AMOUNT OF SOLUBLE FRACTION (%) | 23.1 | 23.0 | 31.0 | 30.0 |
| | AMOUNT OF SOLUBLE FRACTION IN HOT WATER (%) | 33.7 | 38.6 | 42.3 | 60.9 |
| | VISCOSITY (mPa·s) | 580 | 230 | 65 | 8 |
| EVALUATION RESULT | EVALUATION OF LUMP (g) | 0 ◎ | 0 ◎ | 0 ◎ | 0 ◎ |
| | DOUGH HARDNESS (g) | 513 ◎ | 330 ○ | 87 X | EQUAL TO OR SMALLER THAN 50 X |
| | EVALUATION OF DOUGH STICKINESS | ○ | ○ | X | X |

| | | EXAMPLE 2-3 | COMPARATIVE EXAMPLE 2-3 | COMPARATIVE EXAMPLE 2-4 | COMPARATIVE EXAMPLE 2-5 |
|---|---|---|---|---|---|
| FORMULATION (% BY MASS) | LOW MOLECULAR WEIGHT CORN STARCH (PEAK MOLECULAR WEIGHT. $1.9 \times 10^4$) | | | | |
| | LOW MOLECULAR WEIGHT TAPIOCA STARCH (PEAK MOLECULAR WEIGHT. $2.1 \times 10^4$) | 20 | 50 | | |
| | LOW MOLECULAR WEIGHT WAXY CORN STARCH (PEAK MOLECULAR WEIGHT. $2.3 \times 10^4$) | | | 20 | 50 |
| | CORN STARCH | 79 | 49 | 79 | 49 |
| | CALCIUM CARBONATE | 1 | 1 | 1 | 1 |
| AMYLOSE CONTENT IN RAW MATERIAL FOR LOW MOLECULAR WEIGHT STARCH (% BY MASS) | | 16 | 16 | 0 | 0 |
| FORMULATION OF LOW MOLECULAR WEIGHT STARCH IN RAW MATERIAL (% BY MASS) | | 20 | 50 | 20 | 50 |
| ANALYSIS RESULT | WATER ABSORPTION RATIO (%) | 523 | 401 | 653 | 289 |
| | DEGREE OF SWELLING IN COLD WATER | 7.6 | 1.7 | 11.8 | 6.6 |
| | AMOUNT OF SOLUBLE FRACTION (%) | 18.4 | 34.7 | 36.0 | 41.2 |
| | AMOUNT OF SOLUBLE FRACTION IN HOT WATER (%) | 42.7 | 50.5 | 75.3 | 42.4 |
| | VISCOSITY (mPa·s) | 1200 | 40 | 640 | 50 |
| EVALUATION RESULT | EVALUATION OF LUMP (g) | 0.6 Δ | 0 ◎ | 2.1 X | 0 ◎ |
| | DOUGH HARDNESS (g) | 574 ◎ | EQUAL TO OR SMALLER THAN 50 X | 318 ○ | EQUAL TO OR SMALLER THAN 50 X |
| | EVALUATION OF DOUGH STICKINESS | Δ | X | X | X |

As shown in Table 2, the proportion of the low molecular weight starch of equal to or higher than 50% by mass provided very low viscosity and worse evaluation result of the stickiness of the dough, exhibiting increased stickiness.

When high amylose corn starch, corn starch or tapioca starch, which contain amylose at a content of equal to or higher than 5% by mass, were employed as the raw material for the low molecular weight starch as described above, the predetermined blending amount thereof provided the composition with moderately high degree of swelling in cold water, substantially no creation of lump and less stickiness.

On the contrary, when the low molecular weight starch employing waxy corn starch containing amylose at a content of 0% by mass as the raw material was blended at an amount of 20% by mass or 50% by mass, the amount of soluble fraction of the resultant material was increased, presenting worse results of the stickiness evaluations of the dough (Comparative Example 2-4, 2-5).

Example 3-1 to 3-3, Comparative Example 3-1

As shown in Table 3, acid-treated high amylose corn starches having different levels of molecular weight reduction were employed, in substitution for the low molecular weight high amylose corn starch of Example 1-4, to obtain the compositions in conformity to the method of Example 1-4. Evaluations for the obtained compositions were made similarly as in Example 1-4. The results are shown in Table 3.

TABLE 3

| | | COMPARATIVE EXAMPLE 3-1 | EXAMPLE 3-1 | EXAMPLE 3-2 |
|---|---|---|---|---|
| LOW MOLECULAR WEIGHT HIGH AMYLOSE CORN STARCH | ACID TREATMENT TIME (HR) | 0 | 1 | 4 |
| | PEAK MOLECULAR WEIGHT | $2.1 \times 10^5$ (UNDER-COMPOSED) | $4.2 \times 10^4$ | $2.9 \times 10^4$ |
| FORMULATION (% BY MASS) | UNDECOMPOSED OR LOW MOLECULAR WEIGHT HIGH AMYLOSE CORN STARCH | 20 | 20 | 20 |
| | CORN STARCH | 79 | 79 | 79 |
| | CALCIUM CARBONATE | 1 | 1 | 1 |
| | AMYLOSE CONTENT IN RAW MATERIAL FOR LOW MOLECULAR WEIGHT STARCH (% BY MASS) | | 70 | |
| | FORMULATION OF LOW MOLECULAR WEIGHT STARCH IN RAW MATERIAL (% BY MASS) | 0 | 20 | 20 |
| ANALYSIS RESULT | WATER ABSORPTION RATIO (%) | 574 | 607 | 566 |
| | DEGREE OF SWELLING IN COLD WATER | 10.6 | 10.3 | 8.9 |
| | AMOUNT OF SOLUBLE FRACTION (%) | 36.1 | 31.0 | 24.8 |
| | AMOUNT OF SOLUBLE FRACTION IN HOT WATER (%) | 38.2 | 47.8 | 40.5 |
| | VISCOSITY (mPa · s) | 4300 | 900 | 840 |
| EVALUATION RESULT | EVALUATION OF LUMP (g) | 7.2 X | 0 ◎ | 0 ◎ |
| | DOUGH HARDNESS (g) | 237 Δ | 225 Δ | 424 ◎ |
| | EVALUATION OF DOUGH STICKINESS | X | Δ | ○ |

| | | EXAMPLE 1-4 | EXAMPLE 3-3 |
|---|---|---|---|
| LOW MOLECULAR WEIGHT HIGH AMYLOSE CORN STARCH | ACID TREATMENT TIME (HR) | 16 | 100 |
| | PEAK MOLECULAR WEIGHT | $1.2 \times 10^4$ | $5.1 \times 10^3$ |
| FORMULATION (% BY MASS) | UNDECOMPOSED OR LOW MOLECULAR WEIGHT HIGH AMYLOSE CORN STARCH | 20 | 20 |
| | CORN STARCH | 79 | 79 |
| | CALCIUM CARBONATE | 1 | 1 |
| | AMYLOSE CONTENT IN RAW MATERIAL FOR LOW MOLECULAR WEIGHT STARCH (% BY MASS) | 70 | |
| | FORMULATION OF LOW MOLECULAR WEIGHT STARCH IN RAW MATERIAL (% BY MASS) | 20 | 20 |
| ANALYSIS RESULT | WATER ABSORPTION RATIO (%) | 783 | 643 |
| | DEGREE OF SWELLING IN COLD WATER | 10.0 | 8.6 |
| | AMOUNT OF SOLUBLE FRACTION (%) | 11.6 | 13.1 |
| | AMOUNT OF SOLUBLE FRACTION IN HOT WATER (%) | 23.7 | 28.9 |
| | VISCOSITY (mPa · s) | 420 | 210 |
| EVALUATION RESULT | EVALUATION OF LUMP (g) | 0 ◎ | 0 ◎ |
| | DOUGH HARDNESS (g) | 664 ◎ | 396 ○ |
| | EVALUATION OF DOUGH STICKINESS | ◎ | ○ |

According to Table 3, the material with no molecular weight reduction provided higher amount of soluble fraction and increased viscosity, increased creation of the lumps, and worse results of the stickiness evaluation of the dough (Comparative Example 3-1). On the contrary, the material with the molecular weight reduction at the level of the peak molecular weight within a range of from $5.1 \times 10^3$ to $4.2 \times 10^4$ provided the composition with moderately high degree of swelling in cold water and enhanced balance between less creation of the lumps and less stickiness. In particular, the peak molecular weight of from $5.1 \times 10^3$ to $2.9 \times 10^4$ provided further enhanced evaluation results in terms of the dough hardness and the dough stickiness.

Examples 4-1 to 4-3, Comparative Example 4-1

Raw materials were blended according to the formulations shown in Table 4, and the compositions were obtained in conformity to Example 1-4. Evaluations for the obtained compositions were made as in Example 1-4. The results are shown in Table 4.

TABLE 4

| | | EXAMPLE 1-4 | EXAMPLE 4-1 | EXAMPLE 4-2 | EXAMPLE 4-3 | COMPARATIVE EXAMPLE 4-1 |
|---|---|---|---|---|---|---|
| FORMULATION (% BY MASS) | LOW MOLECULAR WEIGHT HIGH AMYLOSE CORN STARCH (PEAK MOLECULAR WEIGHT: $1.2 \times 10^4$) | 20 | 20 | 20 | 20 | |
| | CORN STARCH | 79 | | | | |
| | PHOSPHATE CROSS-LINKED WHEAT STARCH | | 79 | | | |
| | POTATO STARCH | | | 79 | | |
| | PHOSPHATE CROSS-LINKED TAPIOCA STARCH | | | | 79 | 99 |
| | CALCIUM CARBONATE | 1 | 1 | 1 | 1 | 1 |
| | AMYLOSE CONTENT IN RAW MATERIAL FOR LOW MOLECULAR WEIGHT STARCH (% BY MASS) | | | 70 | | |
| | FORMULATION OF LOW MOLECULAR WEIGHT STARCH IN RAW MATERIAL (% BY MASS) | 20 | 20 | 20 | 20 | 0 |
| ANALYSIS RESULT | WATER ABSORPTION RATIO (%) | 783 | 599 | 1136 | 659 | 299 |
| | DEGREE OF SWELLING IN COLD WATER | 10.0 | 7.5 | 17.6 | 9.6 | 11.5 |
| | AMOUNT OF SOLUBLE FRACTION (%) | 11.6 | 6.7 | 29.9 | 20.9 | 65.4 |
| | AMOUNT OF SOLUBLE FRACTION IN HOT WATER (%) | 23.7 | 15.8 | 46.7 | 36.7 | 76.1 |
| | VISCOSITY (mPa · s) | 420 | 85 | 3700 | 3500 | 640 |
| EVALUATION RESULT | EVALUATION OF LUMP (g) | 0  ⊚ | 0  ⊚ | 0.5  △ | 0.8  △ | 12.7  X |
| | DOUGH HARDNESS (g) | 664  ⊚ | 1150  ⊚ | 320  ○ | 389  ○ | 91  X |
| | EVALUATION OF DOUGH STICKINESS | ⊚ | ⊚ | △ | △ | X |

As shown in Table 4, any of starches employed in Examples were able to be used as the starch except low molecular weight starch. In particular, the use of the corn starch provided best balance between less creation of the lumps and less stickiness. On the other hand, the use of only the phosphate cross-linked tapioca starch containing no low molecular weight starch caused higher amount of soluble fraction, easy creation of the lumps, providing worse results of the stickiness evaluation for the water-absorbed dough (Comparative Example 4-1).

Examples 5-1 and 5-2

Raw materials were blended according to the formulations shown in Table 5, and the compositions were obtained in conformity to Example 1-4. Evaluations for the obtained compositions were made as in Example 1-4. The results are shown in Table 5.

TABLE 5

| | | EXAMPLE 5-1 | EXAMPLE 1-4 | EXAMPLE 5-2 |
|---|---|---|---|---|
| FORMULATION (% BY MASS) | LOW MOLECULAR WEIGHT HIGH AMYLOSE CORN STARCH (PEAK MOLECULAR WEIGHT: $1.2 \times 10^4$) | 20 | 20 | 20 |
| | CORN STARCH | 80 | 79 | 78.7 |
| | EMULSIFIER AGENT | | | 0.3 |
| | CALCIUM CARBONATE | | 1 | 1 |
| | AMYLOSE CONTENT IN RAW MATERIAL FOR LOW MOLECULAR WEIGHT STARCH (% BY MASS) | | 70 | |
| | FORMULATION OF LOW MOLECULAR WEIGHT STARCH IN RAW MATERIAL (% BY MASS) | 20 | 20 | 20 |

TABLE 5-continued

|  |  | EXAMPLE 5-1 | EXAMPLE 1-4 | EXAMPLE 5-2 |
|---|---|---|---|---|
| ANALYSIS RESULT | WATER ABSORPTION RATIO (%) | 686 | 783 | 748 |
|  | DEGREE OF SWELLING IN COLD WATER | 8.9 | 10.0 | 9.7 |
|  | AMOUNT OF SOLUBLE FRACTION (%) | 23.2 | 11.6 | 24.4 |
|  | AMOUNT OF SOLUBLE FRACTION IN HOT WATER (%) | 23.2 | 23.7 | 24.4 |
|  | VISCOSITY (mPa · s) | 165 | 420 | 220 |
| EVALUATION RESULT | EVALUATION OF LUMP (g) | 0 ◎ | 0 ◎ | 0 ◎ |
|  | DOUGH HARDNESS (g) | 563 ◎ | 664 ◎ | 355 ○ |
|  | EVALUATION OF DOUGH STICKINESS | ○ | ◎ | ○ |

All of the compositions shown in Table 5 exhibited performances of enhanced balances among higher water absorbability, less creation of the lumps and less stickiness. In particular, blending calcium carbonate provided better evaluation result of the stickiness of the dough.

Examples 6-1 and 6-2, Comparative Example 6-1

Raw materials were blended according to the formulations shown in Table 6, and the compositions were obtained in conformity to Example 1-4. Evaluations for the obtained compositions were made as in Example 1-4. The results are shown in Table 6.

TABLE 6

|  |  | EXAMPLE 1-4 | EXAMPLE 6-1 | EXAMPLE 6-2 | COMPARATIVE EXAMPLE 6-1 |
|---|---|---|---|---|---|
| FORMULATION (% BY MASS) | LOW MOLECULAR WEIGHT HIGH AMYLOSE CORN STARCH (PEAK MOLECULAR WEIGHT: $1.2 \times 10^4$) | 20 | 18 | 16 | 14 |
|  | CORN STARCH | 79 | 71.1 | 63.2 | 55.3 |
|  | CALCIUM CARBONATE | 1 | 0.9 | 0.8 | 0.7 |
|  | DEFATTED SOY FLOUR | 0 | 10 | 20 | 30 |
| AMYLOSE CONTENT IN RAW MATERIAL FOR LOW MOLECULAR WEIGHT STARCH (% BY MASS) | | 70 | 70 | 70 | 70 |
| FORMULATION OF LOW MOLECULAR WEIGHT STARCH IN RAW MATERIAL (% BY MASS) | | 20 | 18 | 16 | 14 |
| ANALYSIS RESULT | WATER ABSORPTION RATIO (%) | 783 | 663 | 589 | 575 |
|  | DEGREE OF SWELLING IN COLD WATER | 10.0 | 8.9 | 8.0 | 7.9 |
|  | AMOUNT OF SOLUBLE FRACTION (%) | 11.6 | 14.4 | 13.7 | 15.1 |
|  | AMOUNT OF SOLUBLE FRACTION IN HOT WATER (%) | 23.7 | 29.8 | 41.9 | 32.0 |
|  | VISCOSITY (mPa · s) | 420 | 280 | 86 | 46 |
| EVALUATION RESULT | EVALUATION OF LUMP (g) | 0 ◎ | 0 ◎ | 0 ◎ | 0 ◎ |
|  | DOUGH HARDNESS (g) | 664 ◎ | 478 ◎ | 360 ○ | 223 Δ |
|  | EVALUATION OF DOUGH STICKINESS | ◎ | ○ | Δ | X |

As shown in Table 6, the tendency was found that lower proportion of the starch provided lower viscosity of the dough, and the proportion of the starch of equal to or lower than 69.3% by mass provided lower viscosity and insufficient hardness of the water-absorbed dough of the composition (Comparative Example 6-1). On the contrary, improved compositions were able to be obtained in Examples, and in particular, and the proportion of the starch of equal to or higher than 89.1% by mass provided further improved compositions.

Examples 7-1 to 7-4, Comparative Examples 7-1 and 7-2

As shown in Table 7, the pulverized product obtained in Example 1-5 was sieved, and the obtained sieved product was blended.

TABLE 7

|  |  | EXAMPLE 7-1 | EXAMPLE 7-2 | EXAMPLE 7-3 | EXAMPLE 7-4 | COMPARATIVE EXAMPLE 7-1 | COMPARATIVE EXAMPLE 7-2 |
|---|---|---|---|---|---|---|---|
| FORMULATION (% BY MASS) | OVERSIEVE ON 0.5 MM MESH AND UNDERSIEVE UNDER 1.0 MM MESH | | | 20 | 40 | 60 | 80 |
|  | OVERSIEVE ON 0.18 MM MESH AND UNDERSIEVE UNDER 0.5 MM MESH | | 70 | 80 | 60 | 40 | 20 |
|  | UNDERSIEVE UNDER 0.18 MM MESH | 100 | 30 | | | | |

TABLE 7-continued

|  |  | EXAMPLE 7-1 | EXAMPLE 7-2 | EXAMPLE 7-3 | EXAMPLE 7-4 | COMPARATIVE EXAMPLE 7-1 | COMPARATIVE EXAMPLE 7-2 |
|---|---|---|---|---|---|---|---|
| ANALYSIS RESULT | WATER ABSORPTION RATIO (%) | 626 | 634 | 643 | 605 | 587 | 456 |
|  | DEGREE OF SWELLING IN COLD WATER | 7.3 | 7.9 | 7.2 | 7.4 | 7.0 | 6.9 |
|  | AMOUNT OF SOLUBLE FRACTION (%) | 12.6 | 7.5 | 9.0 | 8.7 | 7.3 | 7.4 |
|  | AMOUNT OF SOLUBLE FRACTION IN HOT WATER (%) | 26.1 | 21.3 | 20.4 | 19.3 | 17.9 | 17.2 |
|  | VISCOSITY (mPa · s) | 250 | 140 | 110 | 88 | 44 | 46 |
| EVALUATION RESULT | EVALUATION OF LUMP (g) | 0 ⊚ | 0 ⊚ | 0 ⊚ | 0 ⊚ | 0 ⊚ | 0 ⊚ |
|  | DOUGH HARDNESS (g) | 454 ⊚ | 385 ○ | 311 ○ | 310 ○ | 270 Δ | 257 Δ |
|  | EVALUATION OF DOUGH STICKINESS | ○ | ○ | ○ | Δ | X | X |

As shown in Table 7, the tendency was found that the larger proportion of the fraction of oversieve on 0.5 mm mesh and undersieve under 1.0 mm mesh provided lower degree of swelling in cold water and lower viscosity. When the above-described fraction was employed in the formulations of Examples 7-1 to 7-4, the resultant products having higher water absorbability and lower stickiness were obtained. These also had appropriate binding property from the touching feel of the dough.

Examples 8-1 to 8-4

Raw materials having similar formulation as in Example 1-4 was gelatinized by the process described in Table 8 to obtain the compositions having different degrees of gelatinization. In the gelatinizing process employing the extruder, the outlet temperature of the extruder was suitably adjusted to obtain the compositions having different degrees of gelatinization. It is the tendency that the obtained composition exhibited reduced viscosity and degree of swelling in cold water as the degree of the gelatinization thereof was increased.

On the other hand, in the gelatinizing process employing the drum dryer, a raw material slurry, which was prepared by suspending the raw materials in water and adjusting the specific weight to 13 Baume, was heated with ONLATOR™ to present a gelatinized solution. At this time, the outlet temperature of ONLATOR™ was 114 degrees C. This gelatinized solution was immediately gelatinized with a double drum dryer at 150 degrees C. The obtained composition exhibited higher water absorbability, was hard to create lumps, and exhibited lower stickiness. These also had appropriate binding property from the touching feel of the dough.

TABLE 8

|  |  | EXAMPLE 8-1 | EXAMPLE 1-4 | EXAMPLE 8-2 | EXAMPLE 8-3 | EXAMPLE 8-4 |
|---|---|---|---|---|---|---|
|  | GELATINIZING METHOD | EXTRUDER | | | | DRUM DRYER |
|  | DEGREE OF GELATINIZATION (%) | 35 | 51 | 66 | 72 | 93 |
| ANALYSIS RESULT | WATER ABSORPTION RATIO (%) | 861 | 783 | 716 | 631 | 733 |
|  | DEGREE OF SWELLING IN COLD WATER | 9.6 | 10.0 | 8.2 | 7.3 | 9.3 |
|  | AMOUNT OF SOLUBLE FRACTION (%) | 0.0 | 11.6 | 15.3 | 16.7 | 10.6 |
|  | AMOUNT OF SOLUBLE FRACTION IN HOT WATER (%) | 16.6 | 23.7 | 34.7 | 29.3 | 22.8 |
|  | VISCOSITY (mPa · s) | 840 | 420 | 280 | 280 | 800 |
| EVALUATION RESULT | EVALUATION OF LUMP (g) | 0 ⊚ | 0 ⊚ | 0 ⊚ | 0 ⊚ | 0.3 ○ |
|  | DOUGH HARDNESS (g) | 1012 ⊚ | 664 ⊚ | 301 ○ | 332 ○ | 693 ⊚ |
|  | EVALUATION OF DOUGH STICKINESS | ⊚ | ⊚ | ○ | Δ | ○ |

(Example of Applications for Foods)

Exemplary implementations of applying these compositions obtained in the above-described Examples for the foods will be described.

(Rice-Flour Dumpling)

Rice-flour dumplings containing the compositions in respective Examples were prepared according to the formulations of Table 9, and the workability and the eating-texture of the dough were evaluated.

TABLE 9

| | COMPOSITION EMPLOYED | FORMULATION (PART BY WEIGHT) | | |
|---|---|---|---|---|
| | | RICE FLOUR FOR DUMPLINGS | COMPOSITION | WATER |
| CONTROL EXAMPLE | NONE | 100 | | 90 |
| TEST PRODUCTION EXAMPLE 1 | COMPARATIVE EXAMPLE 1-1 | 80 | 20 | 110 |
| TEST PRODUCTION EXAMPLE 2 | EXAMPLE 1-1 | 80 | 20 | 110 |
| TEST PRODUCTION EXAMPLE 3 | EXAMPLE 1-2 | 80 | 20 | 110 |
| TEST PRODUCTION EXAMPLE 4 | EXAMPLE 1-3 | 80 | 20 | 110 |
| TEST PRODUCTION EXAMPLE 5 | EXAMPLE 1-4 | 80 | 20 | 110 |
| TEST PRODUCTION EXAMPLE 6 | EXAMPLE 1-5 | 80 | 20 | 110 |

TABLE 10

| | WORKABILITY | | EATING TEXTURE | | |
|---|---|---|---|---|---|
| | GATHERING | STICKINESS | SOFTNESS | ELASTICITY | SMOOTHNESS |
| CONTROL EXAMPLE | X | ⊚ | X | ⊚ | ○ |
| TEST PRODUCTION EXAMPLE 1 | ⊚ | X | ⊚ | X | ○ |
| TEST PRODUCTION EXAMPLE 2 | ⊚ | ○ | ⊚ | ○ | ⊚ |
| TEST PRODUCTION EXAMPLE 3 | ⊚ | ○ | ⊚ | ⊚ | ⊚ |
| TEST PRODUCTION EXAMPLE 4 | ⊚ | ⊚ | ⊚ | ⊚ | ⊚ |
| TEST PRODUCTION EXAMPLE 5 | ⊚ | ⊚ | ⊚ | ⊚ | ⊚ |
| TEST PRODUCTION EXAMPLE 6 | ⊚ | ⊚ | ⊚ | ⊚ | ⊚ |

The workability at the time of preparation of the rice-flour dumpling and the eating-texture thereof after the boiling were shown in Table 10. Concerning Control Example, when 110 parts by weight of water was added similarly as in Test Production Examples 1 to 6 over 100 parts by weight of the rice flour for dumplings, the resultant product was slurry-like, and could not be shaped. Thus, the blending amount of water was set to 90 parts by weight in Control Example. In Test Production Example 2-6, in which the compositions of Examples were formulated, workability during the shaping was better and the shaped product was flexible and easily gathered, even if 110 parts by weight water was formulated. On the contrary, Test Production Example 1 exhibited higher stickiness and poor workability. Concerning the eating-texture, Test Production Examples 2 to 6 exhibited soft and improved eating-texture for ease of eating while being elastic.

(Hamburg Steak)

Hamburg steaks formulated with the compositions of Example 1-1 to 1-5 or Comparative Example 1-1 were prepared by the above-described method, and the workability during the production and the eating-texture after heating were evaluated.

TABLE 11

| | TEST PRODUCTION EXAMPLE 7 | TEST PRODUCTION EXAMPLE 8 | TEST PRODUCTION EXAMPLE 9 | TEST PRODUCTION EXAMPLE 10 | TEST PRODUCTION EXAMPLE 11 | TEST PRODUCTION EXAMPLE 12 |
|---|---|---|---|---|---|---|
| COMPOSITION EMPLOYED | COMPARATIVE EXAMPLE 1-1 | EXAMPLE 1-1 | EXAMPLE 1-2 | EXAMPLE 1-3 | EXAMPLE 1-4 | EXAMPLE 1-5 |
| WORKABILITY | X | Δ | ○ | ⊚ | ⊚ | ○ |
| EATING TEXTURE | X | Δ | ○ | ⊚ | ⊚ | ○ |

The workability and the eating-texture for the hamburg steak were shown in Table 11. The hamburg steaks formulated with the compositions of Examples 1-1 to 1-5 exhibited less stickiness and improved eating-texture without starchy texture, even though these were formulated with larger amount of water. On the contrary, when the composition of Comparative Example 1-1 was blended, the workability and the eating-texture were unfavorable.

(Bread Loaf)

Bread loaves containing the composition of Example 1-4 were prepared in accordance with the formulation of Table 12 and the preparation conditions described in Table 13. Units in the formulation of Table 12 are parts by weight.

TABLE 12

FORMULATION (PART BY WEIGHT)

| | CONTROL EXAMPLE | TEST PRODUCTION EXAMPLE 13 |
|---|---|---|
| HARD WHEAT FLOUR | 100 | 80 |
| COMPOSITION OF EXAMPLE 1-4 | 0 | 18 |
| VITAL GLUTEN | 0 | 2 |
| EMULSIFYING AGENT | 0.3 | 0.3 |
| YEAST FOOD | 0.1 | 0.1 |
| MARGARINE | 5 | 5 |
| SEMI-DRY YEAST | 1 | 1 |
| SUPERFINE SUGAR | 5 | 7 |
| SALT | 2 | 2 |
| SKIM MILK | 2 | 3 |
| WATER | 68 | 98.4 |

TABLE 13

| | |
|---|---|
| MIXING | LOW SPEED 5 MINUTES, INTERMEDIATE SPEED 5 MINUTES, HIGH SPEED 1 MINUTES, OIL OR FAT SUPPLY, LOW SPEED 4 MINUTES, INTERMEDIATE SPEED 4 MINUTES, AND HIGH SPEED 2 MINUTES |
| KNEADING TEMPERATURE | 27° C. |
| FERMENTATION | TEMPERATURE: 28 DEGREES C. TIME: 60 MINUTES |
| DIVIDED WEIGHT | 160 g |
| BENCH TIME | 20 MINUTES |
| SHAPING | 1.5 LOAF OF SANDWICH BREAD |
| SECONDARY FERMENTATION | TEMPERATURE: 38 DEGREES C. HUMIDITY: 80% TIME: 50 MINUTES |
| BAKING | UPPER HEATER TEMPERATURE: 200 DEGREES C., LOWER HEATER TEMPERATURE: 190 DEGREES C. TIME: 30 MINUTES |

The dough employed during the preparation of the bread loaf exhibited less stickiness even though larger amount of water was added, and thus exhibited improved dough property with appropriate elasticity. In addition, the obtained bread loaf presented enhanced moist texture and soft texture and thus improved eating-texture, in comparison with Control Example without the composition of the present invention.

(Batter Liquid (Batter Material for Fried Foods))

Batter liquids for deep-fried foods were prepared according to the formulations shown in Table 14 (part by weight). First of all, all the powder raw materials except soy sauce, sake and water were uniformly mixed. A mixture liquid of soy sauce, sake and water was added drop by drop thereto and was mixed well until all raw materials were evenly dispersed to obtain a batter liquid.

TABLE 14

| | CONTROL EXAMPLE | TEST PRODUCTION EXAMPLE 14 |
|---|---|---|
| OIL OR FAT PROCESSED TAPIOCA STARCH | 90 | 45 |
| COMPOSITION OF EXAMPLE 1-4 | 0 | 45 |
| CORN STARCH | 10 | 10 |
| POLYSACCHARIDE THICKENER (XANTHANE GUM) | 0.4 | 0.4 |
| SUPERFINE SUGAR | 1 | 1 |
| CHICKEN BOUILLON | 2 | 2 |
| WHITE PEPPER | 1 | 1 |
| BLACK PEPPER | 2 | 2 |
| SOY SOURCE | 35 | 35 |
| SAKE | 15 | 15 |
| WATER | 130 | 250 |

Since the batter liquid prepared by formulating the composition of Example 1-4 was configured to allow having appropriate viscosity, amount of water added thereto could be increased, in comparison with Control Example. In addition, it was difficult to create lumps during the work steps, and thus improved workability was achieved. The coating of batter covering the deep-fried food, which was oil-fried with this batter liquid as the batter material, presented improved crispy eating-texture.

(Tuna Salad)

Tuna salads were prepared according to the formulation shown in Table 15 (part by weight). More specifically, the following preparations were conducted. All the raw materials except the composition of Comparative Example 1-1 or the composition of Example 1-4 were uniformly mixed. The mixture was divided into three portions of specified quantities, and one of three was adopted as the tuna salad of Control Example 15-1 as it was without further preparation. The composition of Comparative Example 1-1 or the composition of Example 1-4 was added as its powder form by smaller units to other two portions, and was mixed well until all the raw materials were evenly dispersed to obtain tuna salads of Control Example 15-2 and Test Production Example 15, respectively. These tuna salads were stored at 5 degrees C. for 24 hours, and syneresis after the storage was observed by visually inspection.

TABLE 15

| | CONTROL EXAMPLE 15-1 | CONTROL EXAMPLE 15-2 | TEST PRODUCTION EXAMPLE 15 |
|---|---|---|---|
| TUNA | 85 | 85 | 85 |
| ONION | 75 | 75 | 75 |
| MAYONNAISE | 40 | 40 | 40 |
| SALT | 0.7 | 0.7 | 0.7 |
| PEPPER | 0.1 | 0.1 | 0.1 |
| COMPOSITION OF COMPARATIVE EXAMPLE 1-1 | — | 12 | — |
| COMPOSITION OF EXAMPLE 1-4 | — | — | 12 |

Large amount of syneresis due to the storage was confirmed for the tuna salad of Control Example 15-1, which was prepared without blending the present composition. In contrast, the tuna salads of Control Example 15-2 and Test Production Example 15, which were prepared by formulating the composition of Comparative Example 1-1 or the composition of Example 1-4, respectively, exhibited substantially no syneresis. However, the tuna salad of Control Example 15-2, which was formulated with the composition of Comparative Example 1-1, presented strong adhesion, with poor crisp texture of onion and poor eating-texture of tuna. On the contrary, the tuna salad of Test Production Example 15, which was formulated with the composition of Example 1-4, presented substantially no adhesion, and gave strong crisp texture of onion and gave strong eating-texture of tuna.

(Red Bean Paste)

Red bean pastes were prepared according to the formulation shown in Table 16 (part by weight). More specifically, the following preparations were conducted. For the red bean paste of Control Example 16-1, among the components shown in Table 16, superfine sugar and water were mixed, and then bean paste containing whole beans was added and was further mixed to obtain the red bean paste. Meanwhile, superfine sugar was mixed with the composition of Comparative Example 1-1 or the composition of Example 1-4. Water was added, and let the product absorbing water well to obtain a water-absorbed product. Bean paste containing whole beans was added to this water-absorbed product, and was mixed well to obtain the red bean pastes of Control Example 16-2 and Test Production Example 16.

TABLE 16

|  | CONTROL EXAMPLE 16-1 | CONTROL EXAMPLE 16-2 | TEST PRODUCTION EXAMPLE 16 |
|---|---|---|---|
| BEAN PASTE CONTAINING WHOLE BEANS | 100 | 100 | 100 |
| SUPERFINE SUGAR | 10 | 10 | 10 |
| WATER | 15 | 15 | 15 |
| COMPOSITION OF COMPARATIVE EXAMPLE 1-1 | — | 5 | — |
| COMPOSITION OF EXAMPLE 1-4 | — | — | 5 |

Since the red bean paste of Control Example 16-1 was prepared without blending the composition of Comparative Example 1-1 and the composition of Example 1-4, the added water was not be able to be completely absorbed at the time of the preparation, and thus the bean paste dough was soft, and exhibited poor shape retention. Further, the resultant red bean paste was sticky, and exhibited homogeneous eating-texture over the whole product, and the presence of whole beans in the bean paste was poor.

The red bean paste of Test Production Example 16 prepared by blending the composition of Example 1-4 was able to firmly absorb the added water at the time of the preparation, and exhibited enhanced shape retention. The resultant red bean paste exhibited smooth feeling on the tongue and non-sticky texture with smaller stickiness and with strong presence of whole beans in the bean paste. Further, there were few changes on the eating-texture after the storage.

On the contrary, the red bean paste of Control Example 16-2 obtained by blending the composition of Comparative Example 1-1 created noticeable lumps of the composition of Comparative Example 1-1 at the time of production, exhibited strong adhesion and poor formability. The resultant red bean paste was very sticky, and exhibited starchy eating-texture. In addition, hardening of the eating-texture was seen after the storage.

(Croquette)

Croquettes were prepared according to the formulation shown in Table 17 (part by weight). More specifically, the following preparations were conducted. Base materials for croquette were mixed well, and mashed potato, and the composition of Comparative Example 1-1 or the composition of Example 1-4 and hot water were mixed therein, and the mixture was stirred well. 45 g of the resultant croquette dough was formed, and separating powder (soft flour), batter (Softcoat AY: commercially available from J-OIL MILLS, Inc. Co., Ltd.), and bread crumbs were adhered. The deep-frying was carried out at 180 degrees C. for 3 minutes to obtain croquettes of Control Example 17-2 and Test Production Example 17. In Control Example 17-1, the base materials for croquette obtained in the above-described procedure was mixed with mashed potato and hot water, and then croquette was obtained by the above-mentioned procedure.

TABLE 17

|  |  | CONTROL EXAMPLE 17-1 | CONTROL EXAMPLE 17-2 | TEST PRODUCTION EXAMPLE 17 |
|---|---|---|---|---|
| BASE MATERIALS FOR CROQUETTE | POTATO | 100 | 100 | 100 |
|  | SKIM MILK | 10 | 10 | 10 |
|  | POWDERED CREAM | 5 | 5 | 5 |
|  | SALT | 1 | 1 | 1 |
|  | SUPERFINE SUGAR | 3 | 3 | 3 |
|  | PEPPER | 0.2 | 0.2 | 0.2 |
|  | MARGARINE | 6 | 6 | 6 |
|  | HOT WATER | 20 | 20 | 20 |
| WATER ABSORBING MATERIAL | MASHED POTATO | 14 | 7 | 7 |
|  | COMPOSITION OF COMPARATIVE EXAMPLE 1-1 | — | 7 | — |
|  | COMPOSITION OF EXAMPLE 1-4 | — | — | 7 |
|  | HOT WATER | 39 | 39 | 39 |

Control Example 17-1 presented the croquette prepared without blending none of the composition of Comparative Example 1-1 and the composition of Example 1-4, and therefore the dough was soft and exhibit poor formability. This also presented strong harsh taste unique to the mashed potato but poor natural flavor of potato.

The croquette of Test Production Example 17 prepared by blending the composition of Example 1-4 exhibited no stickiness in the dough and enhanced formability. The harsh taste unique to the mashed potato was suitably masked and strong natural flavor of potato was exhibited.

On the contrary, the croquette of Control Example 17-1 prepared by blending the composition of Comparative Example 1-1 presented strong adhesion of the dough at the time of the preparation and poor formability. This was very sticky, and exhibited starchy eating-texture.

(Tomato Sauce)

According to the formulation shown in Table 18 (part by weight), the composition of Comparative Example 1-1 or the composition of Example 1-4 was blended to a commercially available tomato sauce [MA-MA, Tomato No Kaniku Tappuri No Tomato (Eggplant and tomato with plentiful fruit pulp of tomato); commercially available from Nisshin Foods Inc.], and a retort heat treatment was carried out at 121 degrees C. for 10 minutes to obtain tomato sauces of Control Example 18-2, Test Production Example 18-1 and Test Production Example 18-2. In addition, a retort heat treatment of 50 parts by weight of the above-described commercially available tomato sauce was carried out at 121 degrees C. for 10 minutes to provide Control Example 18-1.

TABLE 18

|  | CONTROL EXAMPLE 18-1 | CONTROL EXAMPLE 18-2 | TEST PRODUCTION EXAMPLE 18-1 | TEST PRODUCTION EXAMPLE 18-2 |
|---|---|---|---|---|
| COMMERCIAL TOMATO SOURCE | 50 | 50 | 50 | 40 |
| WATER | — | — | — | 8 |
| COMPOSITION OF COMPARATIVE EXAMPLE 1-1 | — | 0.5 | — | — |
| COMPOSITION OF EXAMPLE 1-4 | — | — | 0.5 | 2 |

The tomato sauce (Test Production Example 18-1) prepared by blending 0.5 parts by weight of the composition of Example 1-4 to 50 parts by weight of the commercial tomato sauce exhibited suitably thickness, better smoothness to the mouth and full-bodied richer taste by the retort heat treatment (121 degrees C. for 10 minutes), in comparison with the tomato sauce (Control Example 18-1) that contained no blended composition. Further, the tomato sauce (Test Production Example 18-2) prepared by blending 2 parts by weight of the composition of Example 1-4 to 40 parts by weight of the commercial tomato sauce exhibited raw material texture as if tomato itself was stewed even though water was added thereto, and also exhibited improved eating-texture, in comparison with the tomato sauce (Control Example 18-1) that contained no blended composition.

On the contrary, the tomato source (Control Example 18-2) prepared by blending the composition of Comparative Example 1-1 exhibited strong stickiness by the retort heat treatment. This caused adhesion over an oral cavity, and presented poor smoothness to a mouth. This also presented poor ingredient feeling of tomato and poor full-bodied taste.

The application claims priority on the basis of Japanese Patent Application No. 2013-035406 filed Feb. 26, 2013, the entire contents and disclosures of which are hereby incorporated by reference.

The invention claimed is:

1. A composition comprising starches at a content of equal to or higher than 75% by mass,
wherein the starches comprise a low molecular weight starch and at least one other starch except the low molecular weight starch, a content of the low molecular weight starch being equal to or higher than 3% by mass and equal to or lower than 45% by mass with respect to the total amount of the composition, the low molecular weight starch being obtainable from a starch containing amylose at a content of equal to or higher than 5% by mass as a raw material,
wherein a peak molecular weight of the low molecular weight starch is equal to or higher than $3 \times 10^3$ and equal to or lower than $5 \times 10^4$,
wherein a degree of swelling in cold water of the composition at 25 degrees C. is equal to or higher than 7 and equal to or lower than 20, and
wherein a content of the composition on 0.5 mm mesh after sieving the composition is equal to or lower than 50% by mass with respect to the total amount of the composition.

2. The composition according to claim 1, wherein the raw material for the low molecular weight starch is one or more selected from the group consisting of a high amylose corn starch, a corn starch and a tapioca starch.

3. The composition according to claim 1, wherein the composition comprises one or more starch(es) selected from the group consisting of a corn starch, a wheat starch, a potato starch, a tapioca starch and a cross-linked starch of these starches, as the at least one other starch except the low molecular weight starch.

4. The composition according to claim 1, wherein an amount of a soluble fraction of the composition in hot water at 90 degrees C. is equal to or higher than 8.5% by mass and equal to or lower than 70% by mass.

5. The composition according to claim 1, wherein an amount of a soluble fraction of the composition in water at 25 degrees C. is equal to or lower than 32%.

6. The composition according to claim 1, wherein a viscosity of the composition is equal to or higher than 80 mPa·s and equal to or lower than 4,200 mPa·s.

7. The composition according to claim 1, wherein a water absorption of the composition at 25 degrees C. is equal to or higher than 500% with respect to a dry weight of the composition.

8. A batter material comprising the composition according to claim 1.

9. A food or drink comprising the composition according to claim 1.

10. A feed comprising the composition according to claim 1, wherein the feed includes a pet food or a compound feed for livestock or fowl.

11. A method of producing a composition, comprising:
reducing a molecular weight of starch containing 5% by mass or more of amylose to obtain a low molecular weight starch exhibiting a peak molecular weight of equal to or higher than $3 \times 10^3$ and equal to or lower than $5 \times 10^4$;

mixing the low molecular weight starch with other starch except the low molecular weight starch to obtain a mixture containing the low molecular weight starch at a content of equal to or higher than 3% by mass and equal to or lower than 45% by mass and the other starch except the low molecular weight starch, and, a summation of the contents of the low molecular weight starch and the other starch being equal to or higher than 75% by mass; and gelatinizing the mixture containing the low molecular weight starch and the other starch, wherein a degree of swelling in cold water of the composition at 25 degrees C. is equal to or higher than 7 and equal to or lower than 20, and wherein a content of the composition on 0.5 mm mesh after sieving the composition is equal to or lower than 50% by mass with respect to the total amount of the composition.

12. The method according to claim 11, wherein the molecular weight is reduced by an acid treatment in which the starch is degraded.

13. The composition according to claim 1, wherein the low molecular weight starch and the other starch are gelatinized.

14. The composition according to claim 1, wherein a content of the composition under 0.01 mm mesh after sieving the composition is equal to or lower than 1.5% by mass with respect to the total amount of the composition.

* * * * *